(12) United States Patent
Gavioli et al.

(10) Patent No.: US 11,780,681 B2
(45) Date of Patent: Oct. 10, 2023

(54) DEVICE FOR TRANSPORTING SOLIDS

(71) Applicant: AQSEPTENCE GROUP CARPI S.R.L., Soliera (IT)

(72) Inventors: Andrea Gavioli, Medolla (IT); Dario Nascimbeni, Carpi (IT)

(73) Assignee: AQSEPTENCE GROUP CARPI S.R.L., Soliera (IT)

( * ) Notice: Subject to any disclaimer, the term of this patent is extended or adjusted under 35 U.S.C. 154(b) by 1 day.

(21) Appl. No.: 17/611,681

(22) PCT Filed: May 18, 2020

(86) PCT No.: PCT/IB2020/054676
§ 371 (c)(1),
(2) Date: Nov. 16, 2021

(87) PCT Pub. No.: WO2020/240334
PCT Pub. Date: Dec. 3, 2020

(65) Prior Publication Data
US 2022/0234836 A1    Jul. 28, 2022

(30) Foreign Application Priority Data

May 27, 2019    (IT) .................... 102019000007305

(51) Int. Cl.
| | |
|---|---|
| B65G 33/34 | (2006.01) |
| B01D 29/05 | (2006.01) |
| B65G 33/14 | (2006.01) |
| B65G 33/26 | (2006.01) |

(52) U.S. Cl.
CPC ............. B65G 33/34 (2013.01); B01D 29/05 (2013.01); B65G 33/14 (2013.01); B65G 33/26 (2013.01); B65G 2201/04 (2013.01)

(58) Field of Classification Search
None
See application file for complete search history.

(56) References Cited

U.S. PATENT DOCUMENTS

| | | | | |
|---|---|---|---|---|
| 739,924 | A * | 9/1903 | Pope ..................... | B60G 3/24 180/332 |
| 4,456,305 | A * | 6/1984 | Yoshikawa ............... | E21D 9/12 299/56 |
| 6,096,201 | A * | 8/2000 | Bruke ................ | B01D 21/2444 210/162 |
| 6,651,805 | B2 * | 11/2003 | Yoshikawa ............ | B65G 33/32 198/676 |

(Continued)

FOREIGN PATENT DOCUMENTS

| | | |
|---|---|---|
| CN | 107762521 A | 3/2018 |
| CN | 108328365 A | 7/2018 |

(Continued)

*Primary Examiner* — William R Harp
(74) *Attorney, Agent, or Firm* — BROWDY AND NEIMARK, P.L.L.C.

(57) ABSTRACT

A device (10) for transporting solids that comprises—a support frame (11), —an auger (15) connected to the support frame (11) rotatably about an axis of rotation, —a motor unit (30) configured to activate in rotation the auger (15) that comprises an output shaft (321) being rotatable about an axis of revolution (B), characterized in that the axis of revolution (B) of the output shaft (321) is parallel and eccentric to the axis of rotation (A) of the auger (15).

16 Claims, 9 Drawing Sheets

(56) References Cited

U.S. PATENT DOCUMENTS

2002/0104739 A1    8/2002  Yoshikawa

FOREIGN PATENT DOCUMENTS

| | | | | | |
|---|---|---|---|---|---|
| GB | 569632 | A | | 6/1945 | |
| GB | 2025881 | A | | 1/1980 | |
| GB | 2029477 | A | * | 3/1980 | ............ E21D 9/087 |
| JP | S5973497 | U | | 5/1984 | |
| JP | S60106709 | A | | 6/1985 | |
| WO | 2018198146 | A1 | | 11/2018 | |

* cited by examiner

DEVICE FOR TRANSPORTING SOLIDS

TECHNICAL FIELD

The present invention relates to a device for transporting solids. More in particular, the present invention can be advantageously but not exclusively applied in the separation treatment of solids from waste fluids, to which the following description will make explicit reference but without reducing the generality of the invention.

PRIOR ART

As is known, in the field of treating waste waters, devices are used that are adapted to transport the solid fraction separate from the liquid fraction.

Such devices generally comprise a support frame provided with an inlet mouth immersed in a collection channel into which the water to be treated is conveyed, an outlet mouth and an auger conveyor adapted to collect the solid fraction for discharging it into a relevant container placed at the outlet mouth.

The auger conveyor is activated by a motor generally placed downstream of the auger, in the advancement direction imposed by the rotation of the auger, and connected thereto through a central shaft coaxially associated with the head of the auger, i.e. that extends axially beyond the downstream end of the auger.

With such transport devices of the known type it is often necessary to transport fibrous material, e.g. long fibre material, which sometimes implies the clogging of the unit or the creation of blocks/tangles around the downstream end portion of the auger, which prevent the natural exit of material from the outlet mouth. To prevent or solve such clogging, frequent maintenance interventions are required, with unquestionable disadvantages in terms of the efficiency of the device itself.

An object of the present invention is to overcome the mentioned drawbacks of the prior art, within the context of a simple and rational solution and at a contained cost.

Such purposes are accomplished by the characteristics of the invention given in the independent claim. The dependent claims outline preferred and/or particularly advantageous aspects of the invention.

DISCLOSURE OF THE INVENTION

The invention, in particular, makes available a device for transporting solids that comprises:
 a support frame,
 an auger connected to the support frame rotatably about an axis of rotation,
 a motor unit configured to activate in rotation the auger that comprises an output shaft being rotatable about an axis of revolution,
 wherein the axis of revolution of the output shaft is parallel and eccentric to the axis of rotation of the auger.

Thanks to such solution, the device according to the invention solves the problems encountered in devices for transporting solids of the known type, improving the efficiency thereof, allowing a reduction in maintenance interventions with respect to devices of the known type.

In particular, the motor unit according to the invention is such as to leave free (without transmission shafts and/or other motion transmission means) the zone axially located downstream (in the immediate vicinity) of the auger, allowing all types of material (even fibrous) not to get tangled/twisted and fall freely towards the outlet mouth.

An aspect of the invention with the same purposes outlined above can further envisage that the device comprises a transmission unit configured to connect the output shaft and the auger.

Advantageously, the transmission unit can comprise a pinion fitted onto the output shaft and a toothed crown rigidly fixed to the auger.

Thanks to such solution, the device has a safe and precise transmission in the event of speed variations or multiplications of torque, with generally high performance, as well as high resistance to wear and, therefore, high durability.

Again, another aspect of the invention envisages that the toothed crown can be fixed coaxially to the outside of the auger.

Thanks to such aspect, the transmission of the motion to the auger takes place directly on the outer surface thereof, allowing the central area of the auger to be left free or only partially occupied.

Advantageously, for the purposes illustrated above, the toothed crown can be fixed proximal to or at a downstream end of the auger in an advancement direction imposed by the rotation of the auger on the solids transported thereby.

Another aspect of the invention envisages that the device can comprise a connection flange configured to mutually fix the toothed crown and the auger.

Thanks to such solution the motor unit and/or the transmission unit are arranged in an optimal area of the device with respect to the use thereof.

In this way, effective and functional mutual fixing between the toothed crown and the auger is possible, the latter being reinforced in the connection area by the connection flange and, at the same time, being effectively activated in rotation.

Advantageously, the connection flange can comprise a connection tube.

Preferably, the connection tube can be coaxially fitted onto the auger.

Yet, the connection tube can be fixed to the auger by means of a first connection, for example a first threaded connection or (preferably) a first welded connection, and the connection tube is provided with at least one crest projecting in the radial direction to the outside of the connection tube, wherein the toothed crown is fixed to the crest by means of a second connection, for example a second threaded connection.

Thanks to this, it is possible to have effective and functional mutual fixing between the toothed crown and the connection flange, therefore between the toothed crown and the auger.

A further aspect of the invention envisages that the first threaded connection (where present) can comprise a plurality of first radial screws and/or the second threaded connection can comprise a plurality of second axial screws.

Thanks to this solution, it is possible to make the toothed crown and the auger integral with each other, in a releasable way, through only one connection element interposed between them.

For example, at least one connection block may be interposed between the connection tube (i.e. the connection flange) and the auger, wherein the connection block is fixed to the auger by means of a further connection, in particular a further threaded connection with screwing axis parallel to the axis of rotation of the auger, i.e. for example by means of a plurality of first axial screws.

Yet, according to an advantageous aspect of the invention, the connection tube can have an axial length less than or equal to a pitch of a spiral of the auger, preferably less than or equal to half the pitch of a spiral of the auger.

Thanks to this solution, the correct (and constant) axial advancement of the solid phase transported by the auger towards the axial downstream end thereof is made possible, preventing and/or limiting as much as possible the risk of clogging of (any) transported solid fraction (at the stretch affected by the connection tube) which would generate malfunctions or need for maintenance and/or restoration interventions of the discharge flow.

A further aspect of the invention envisages that the device can comprise a compartment in which the transmission unit is contained; and sealing gaskets interposed between a delimiting wall of the compartment and the connection flange.

In this way the protection of the part of the device affected by the transmission of the motion and the watertight seal of the transmission unit, i.e. the environment in which the motor unit and the transmission unit are contained, is kept separate from the environment in which the auger is contained, hence preventing contamination between the two environments.

Yet another aspect of the invention, with the same aims disclosed above, envisages that the motor unit can be comprised by a motor provided with a motor drive shaft and a reducer provided with an input shaft, connected to the drive shaft of the motor, and the output shaft of the motor unit.

According to another aspect of the invention, the device can comprise a final compacting screen located at a terminal stretch of the auger provided with an axial downstream end thereof, in the advancement direction of the solids imparted by the rotation of the auger by the motor unit.

The final compacting screen is configured to compact the solid fraction before it is discharged (and/or reduce the amount of liquid fraction contained therein), allowing to separate the solid fraction from the liquid fraction more effectively and to squeeze the aforesaid solid fraction more.

Preferably, to make its function more efficient, the final compacting screen can be rigidly fixed to the support frame, i.e. the auger is in relative motion with respect to the final compacting screen (which remains fixed).

Another aspect of the invention makes available a transport unit for transporting solids comprising a collection channel, and a device as described above, wherein at least one end of the auger is inserted in the channel.

This solution allows the aims described above for the solid transport device to be achieved.

BRIEF DESCRIPTION OF THE DRAWINGS

Further features and advantages of the invention will be more apparent after reading the following description provided by way of a non-limiting example, with the aid of the accompanying drawings.

BEST WAY TO ACTUATE THE INVENTION

With particular reference to such figures, 10 indicates overall a device for transporting solids, e.g. in the separation treatment of solids from waste fluids.

More in particular, the device 10 may be a separation device of the solid fraction, in particular of the less fine solid fraction, known as the screening fraction, from waste fluids, e.g. from refluent waters.

In practice, the refluent waters have a solid fraction dispersed and/or in suspension in the liquid fraction, e.g. in water, to be recovered.

Figure 1:
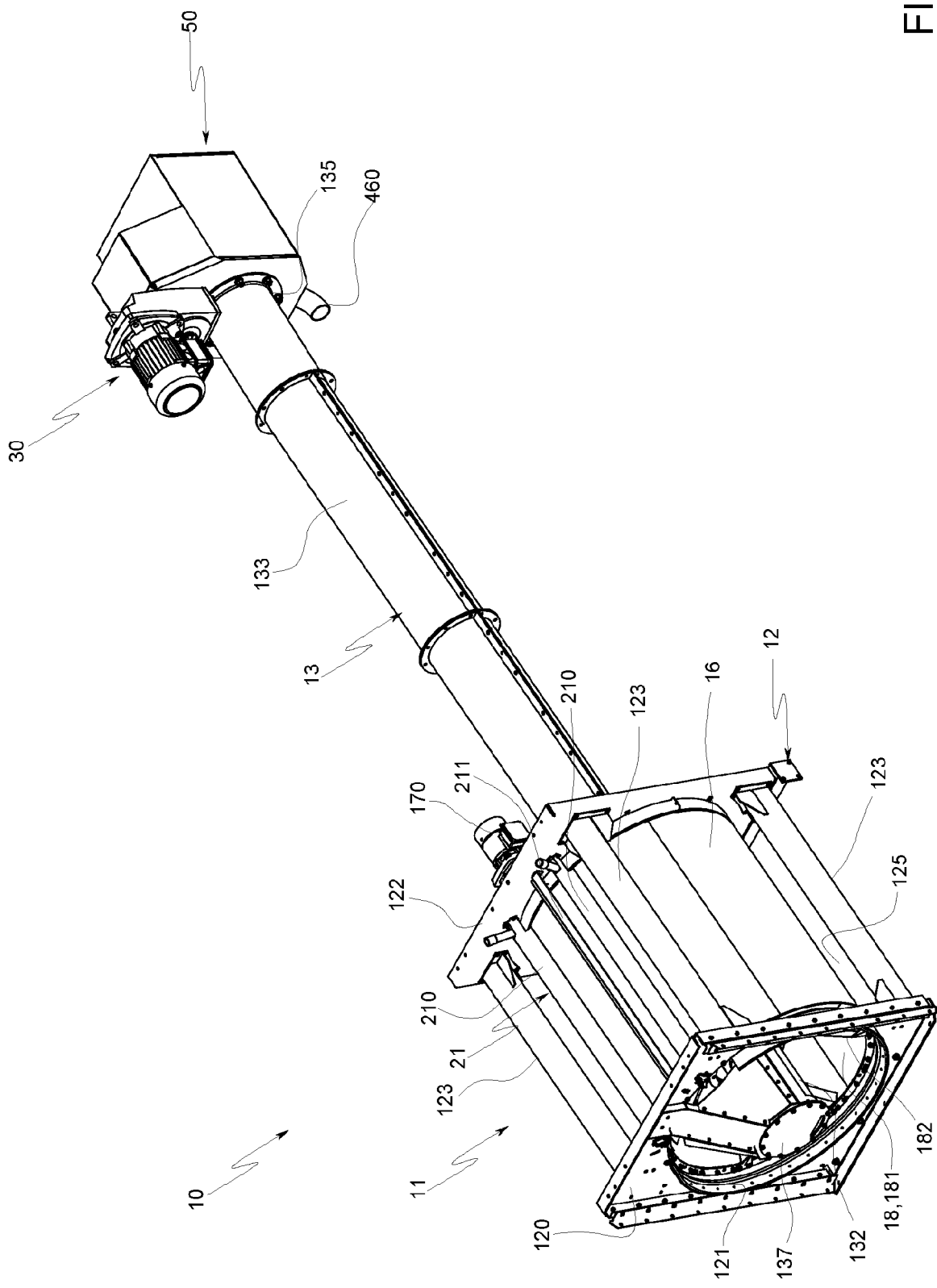
FIG. 1 is an axonometric view of a separation device provided with the solid transport device according to the invention.
Figure 2:
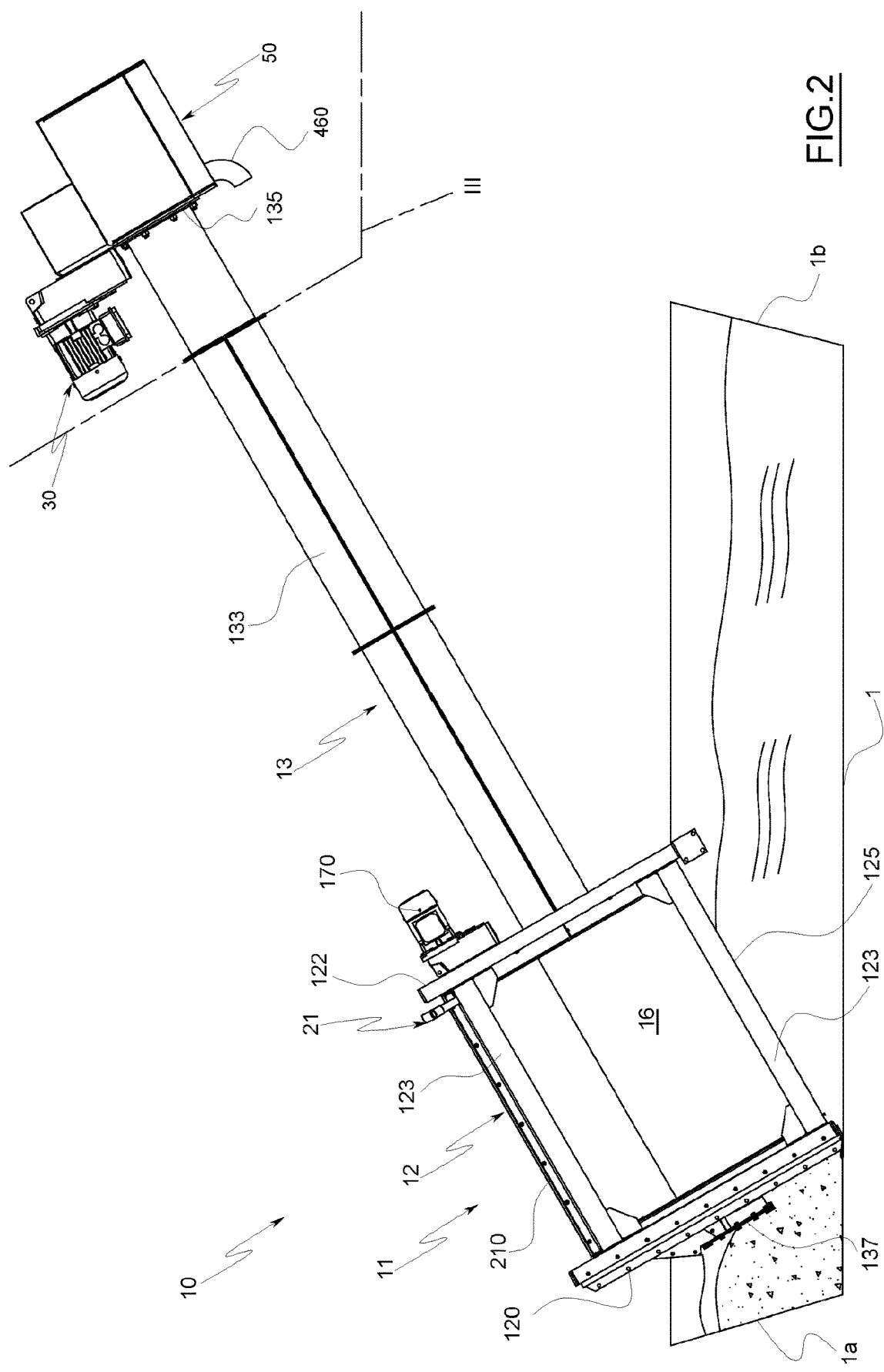
FIG. 2 is a side view of the device of FIG. 1 positioned in a collection channel.
Figure 4:
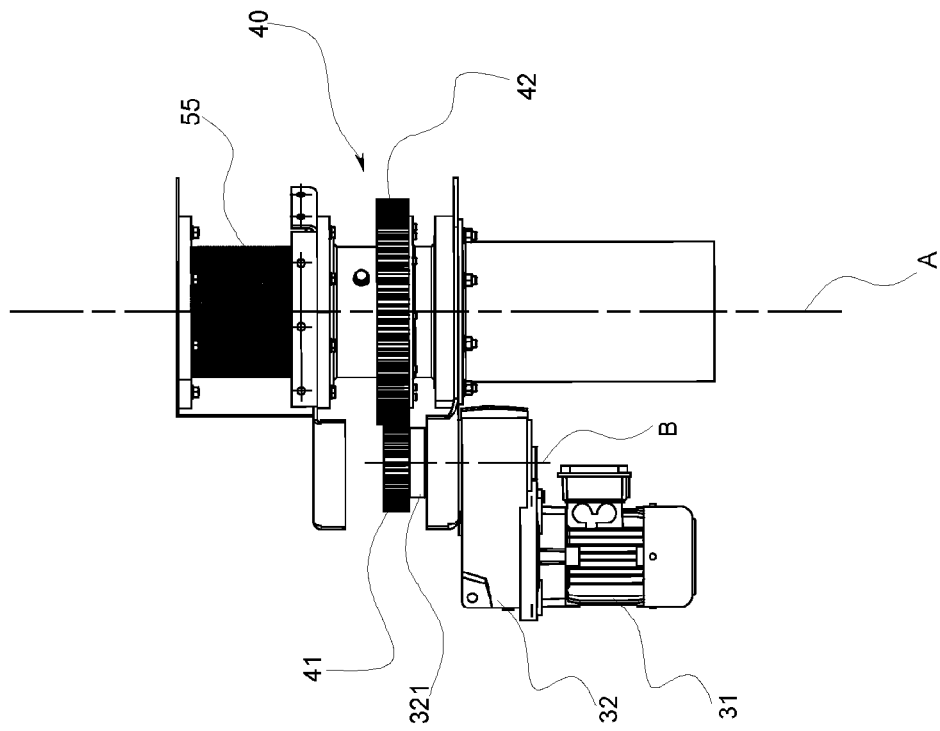
FIG. 4 is the view of FIG. 3 in which the outer casing has been removed to improve the visibility of the internal components.
Figure 3:
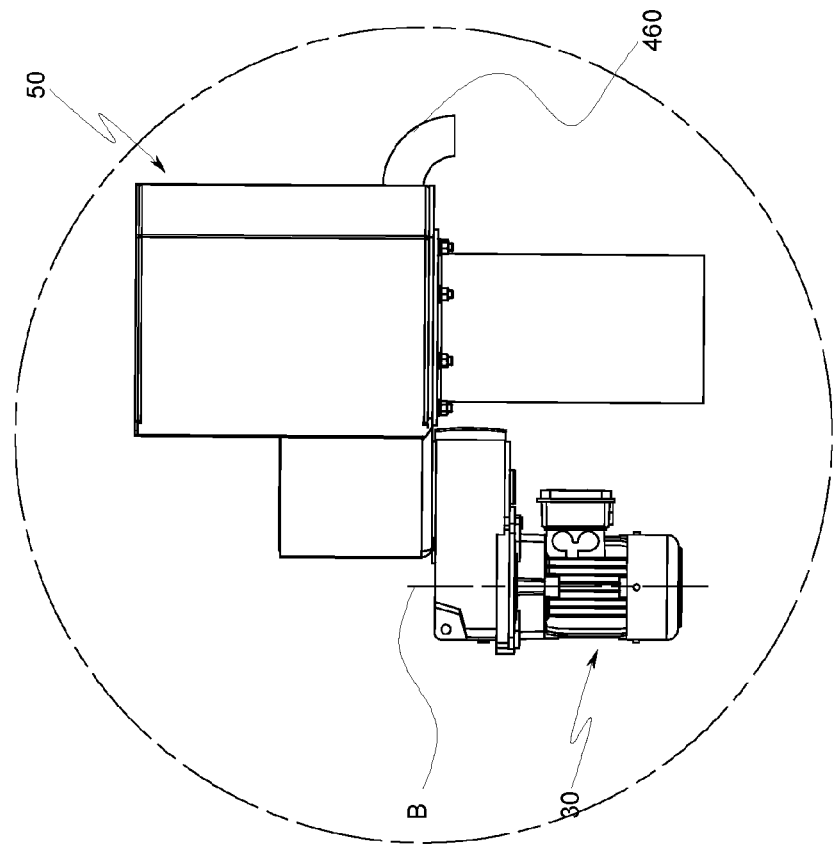
FIG. 3 is an enlargement of the detail III of FIG. 2.
Figure 5:
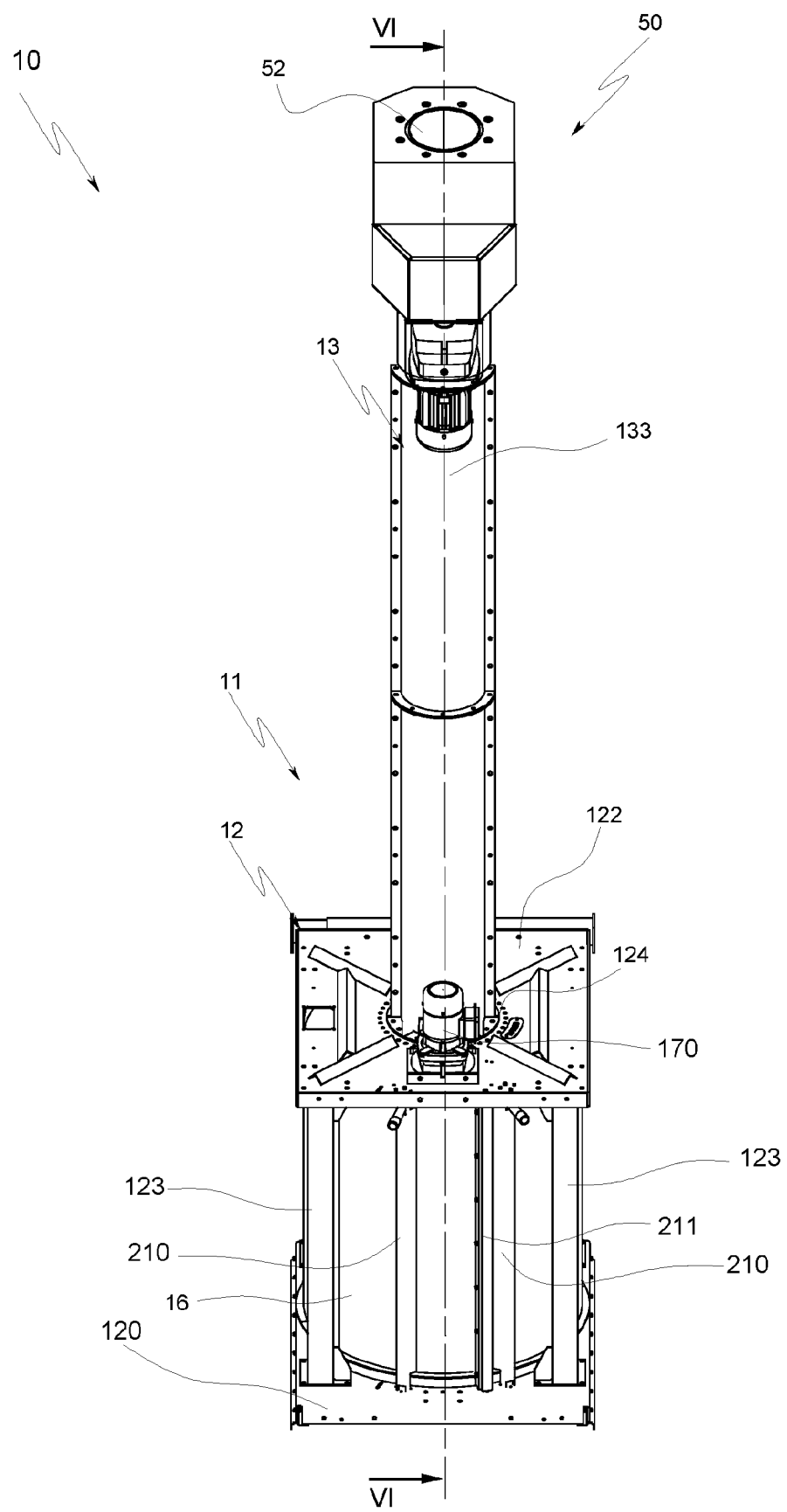
FIG. 5 is a plan view of FIG. 1.
Figure 6:
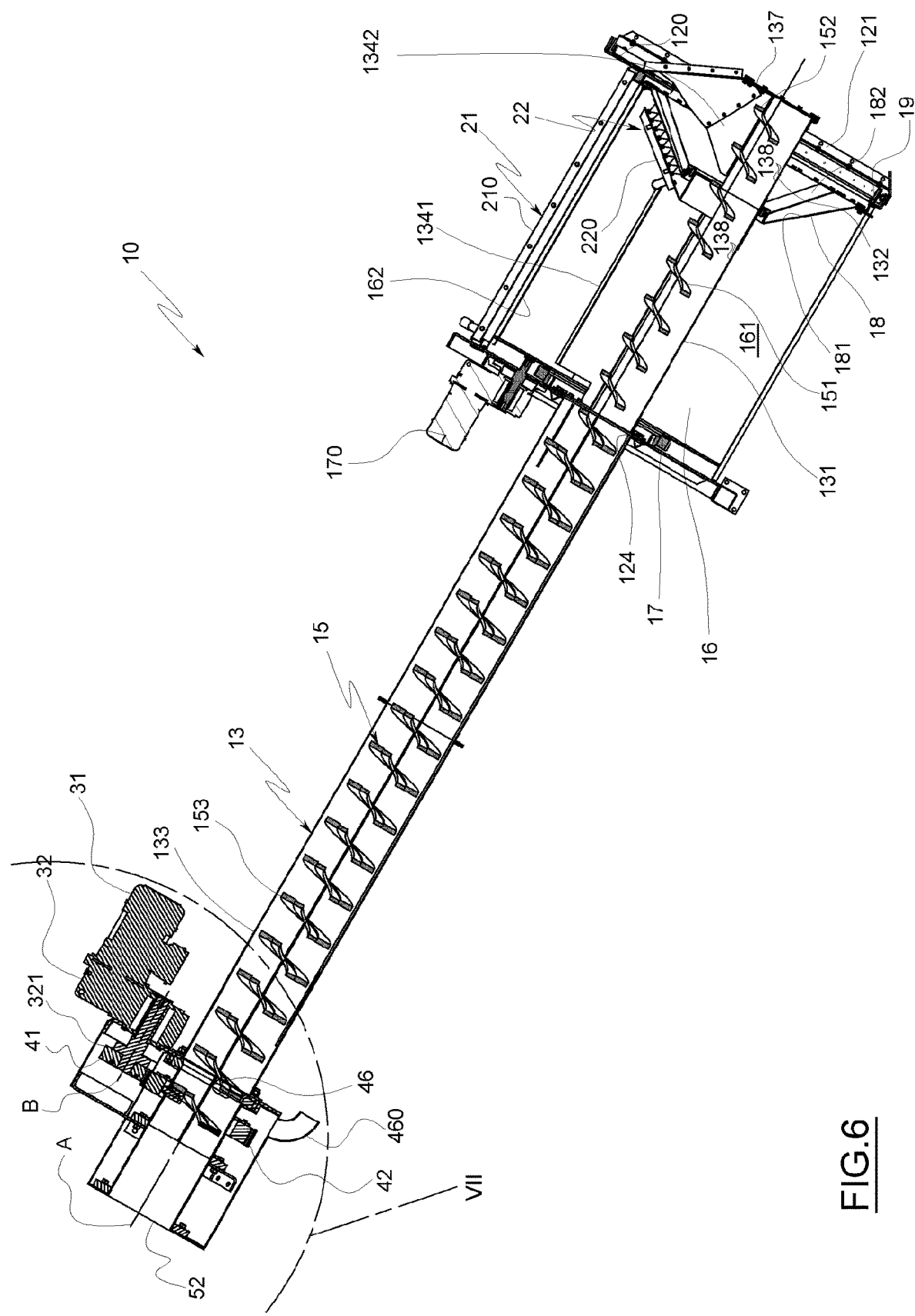
FIG. 6 is a sectional view along the plane of trace VI-VI of FIG. 5.
Figure 7:
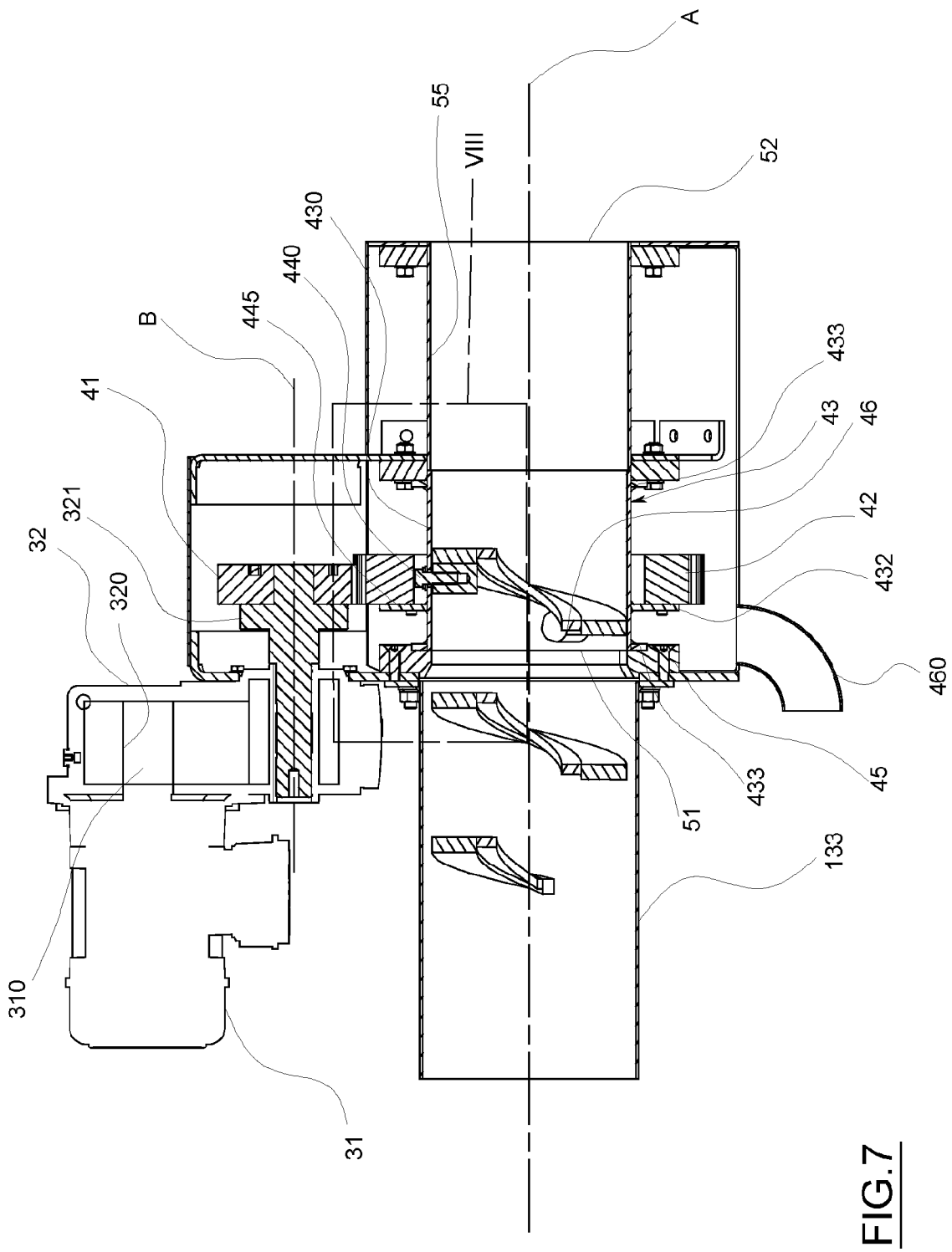
FIG. 7 is an enlargement of the detail VII of FIG. 6.
Figure 8:
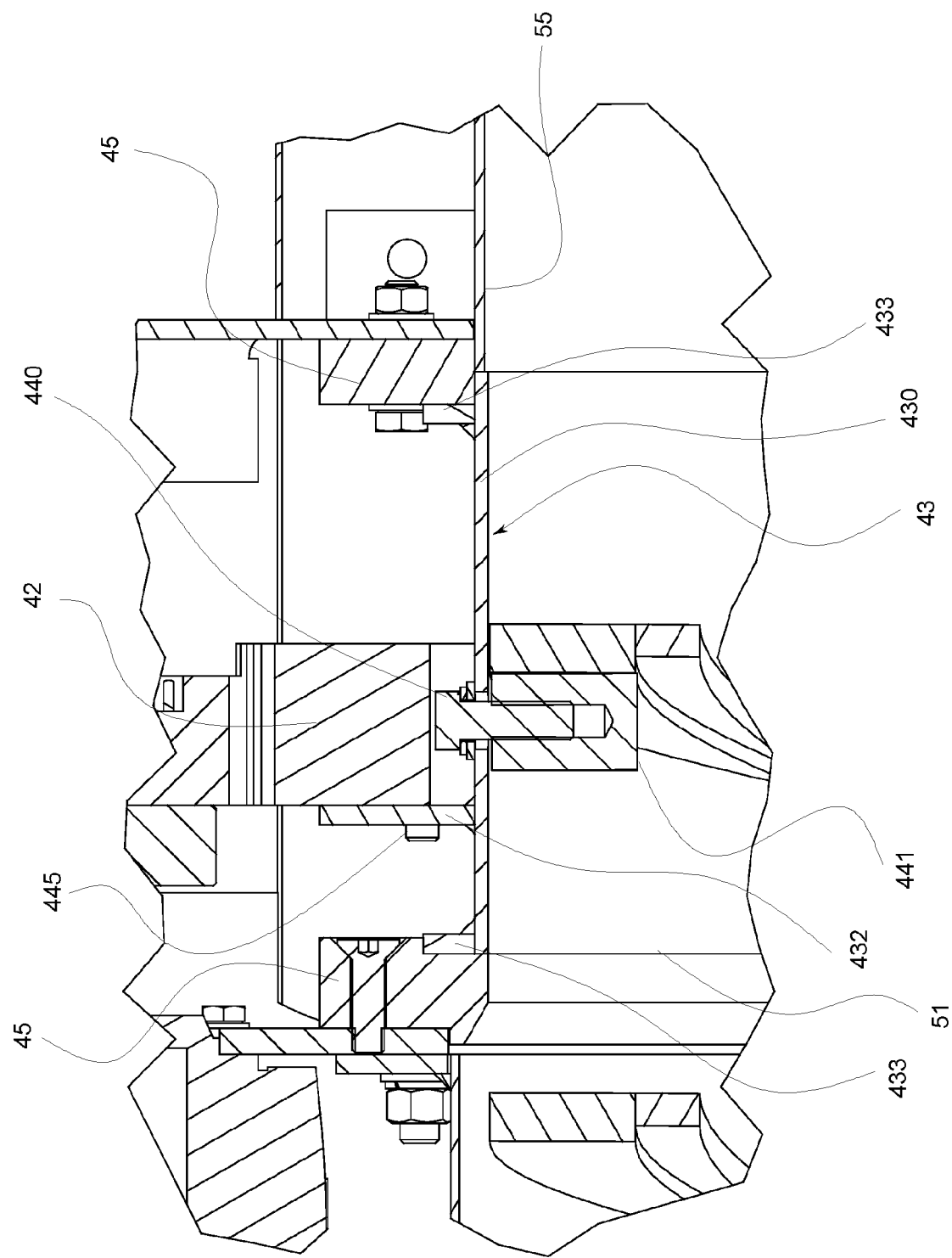
FIG. 8 is an enlargement of the detail VIII of FIG. 7.

The fluid to be separated is generally conveyed into a relevant collection channel 1 (which may be part of the device 10 or already installed in situ according to the circumstances), e.g. long and narrow, at a first longitudinal end 1*a* of which (e.g. through an inlet not shown) the fluid containing the solid fraction to be separated from the liquid fraction is conferred and at whose second end (provided with an outlet not shown) the separated liquid fraction is collected, to be conferred for example to other treatment plants for the fine separation of the sludge still dispersed therein. The collection channel 1 is depicted in FIG. 2.

The device 10 comprises a support frame 11 adapted to be fixed inside the collection channel 1, e.g. in an intermediate area between the first end 1*a* and the second end 1*b*.

The support frame 11, for example, comprises a box-like body 12, e.g. provided with a first wall 120 e.g. provided with a through opening defining an inlet mouth 121, e.g. substantially circular shaped.

In practice, the inlet mouth 121 of the support frame 11 is intended to be arranged, at least partially, inside the collection channel 1.

Generally, the level of the fluid to be separated reaches, during use, about ½ of the height of the inlet mouth 121.

The first wall 120, for example, has a shape that is substantially conjugated to the internal shape of the collection channel 1, so as to rest (substantially sealingly) on the bottom and on the side walls thereof, so as to divide the internal volume of the collection channel 1 into two environments communicating with each other only through the inlet mouth 121.

In practice, the two environments into which the collection channel 1 is divided by the device 10 are a first environment communicating with the inlet of the fluid to be separated, in which the fluid itself to be separated is contained and a second environment communicating with the outlet of the liquid fraction separated from the separation fluid and in which only the liquid fraction of the fluid itself is contained.

The box-like body 12 comprises a second wall 122, opposing the first wall and parallel thereto, joined to the first wall 120 through a plurality of uprights 123, adapted to conform the box-like body 12 substantially like a cage.

The second wall 122 has a through hole 124, e.g. substantially circular shaped, substantially aligned and coaxial with the through opening 121 of the first wall 120.

In practice, the first environment into which the internal volume of the collection channel 1 is divided is in communication with the second environment through the open gaps between the various uprights 123, which gaps define a first outlet mouth 125 of the device 10 from which the liquid fraction exits that is separated from the fluid being treated.

The first wall 120 and the second wall 122 have a substantially square shape (square in the example), there are, for example, four uprights 123 and they connect for example the four vertices of the opposing walls 120, 122, leaving four open walls defined.

For example, it is possible to provide for the box-like body 12 to have one or more infill slabs (not shown) adapted to close at least one of the gaps defined between the uprights 123.

In particular, it is possible to provide for the box-like body 12 to have three infill slabs, each fixed to a pair of contiguous uprights 123 and adapted respectively to close one of the gaps, e.g. the upper gap and the side gaps of the box-like body 12, leaving open only the lower gap that defines said first outlet mouth 125.

The device 10 further comprises a channel 13, which is fixed, for example, to the support frame 11 (regardless of the shape thereof).

The channel 13 for example is inserted into the inlet mouth 121 (e.g. with high radial clearance) and the through hole 124 (e.g. substantially to fit).

In particular, the channel 13 comprises a first stretch 131 defined internally to the box-like body 12, e.g. axially contained between the first wall 120 and the second wall 122.

Furthermore, the channel 13 comprises a second stretch 132 defined substantially straddling the first wall 120 of the box-like body 12, i.e. inserted into the inlet mouth 121, so that it can for example project externally to the box-like body 12 of a reduced axial segment.

The channel 13 comprises a third stretch 133, defined externally to the box-like body 12, in practice extending the first stretch 131 on the opposite side with respect to the second stretch 132.

The third stretch 133 has a distinctly greater length than the second stretch 132 and the latter has a lower length than the length of the first stretch 131.

The channel 13 comprises an access portion 1341,1342 and a second outlet mouth 135 intended to be placed outside the collection channel 1.

The access portion 1341, 1342 is in practice defined at at least one from between the first stretch 131 and the second stretch 132 of the channel 13.

In the example, the channel 13 comprises a first access portion 1341 defined at the first stretch 131 of the channel 13 and a second access portion 1342 defined at the second stretch 132 of the channel 13, e.g. axially separate from each other.

In practice, the first stretch 131 and the second stretch 132 of the channel 13 are open at the top, i.e. they have a substantially U-shaped (substantially circular shaped) cross section.

The access portion 1341, 1342 (i.e. the first access portion 1341 and the second access portion 1342, respectively) is defined by the open section (radial and facing upwards) of the channel 13, at the first stretch 131 and the second stretch 132.

The second outlet mouth 135 is defined at the third stretch 133 of the channel 13, e.g. in proximity to the distal end at the box-like body 12 thereof.

In the example, the second outlet mouth 135 is defined by an axial opening made at the end of the third stretch 133 of the channel 13 opposite the axial end of the channel 13 proximal to the outlet mouth 125.

At least one from the first stretch 131 and the second stretch 132 of the channel 13 comprises drainage holes 138, adapted to allow the drainage of the possible liquid fraction collected in the channel 13.

The drainage holes 138 are for example defined at the bottom of the first stretch 131 and/or of the second stretch 132.

In the example, both the first stretch 131 and the second stretch 132 are provided with respective drainage holes 138.

The channel 13 has a substantially rectilinear longitudinal axis.

Although the channel 13 is illustrated as a set of stretches 131, 132, 133 it could be a channel made as a single body, in which the stretches may be only functionally distinct. Furthermore, the channel 13 preferably has a longitudinal axis that is inclined with respect to the horizontal, so that the second outlet mouth 135 is at a higher level with respect to the access portion 1341, 1342.

For example, the longitudinal axis of the channel 13 is inclined by an angle substantially equal to (or around) 35° with respect to the horizontal.

In the example, the channel 13 is fixed to the box-like body 12, so that the longitudinal axis of the channel 13 is substantially orthogonal to the plane defined by one (both in the example) from between the first wall 120 and the second wall 122.

The box-like body 12 is therefore fixed to the inside of the collection channel 1, so that the longitudinal axis of the channel 13 is inclined with respect to the horizontal and, for example, substantially aligned in the plan view with the longitudinal axis of the collection channel 1 itself (that joins the first end 1a to the second end 1b).

In the example, the axial upstream end of the channel 13, placed in proximity to the inlet mouth 121 and, therefore, of the collection channel 1, is closed by a flange 137 fixed, for example bolted, to the channel itself.

However, it is not excluded that the axial upstream end of the channel 13, placed in proximity to the inlet mouth 121 and, therefore, to the collection channel 1, is open.

The device 10 comprises at least one auger 15 rotatably associated with the inside of the channel 13.

The auger 15 extends longitudinally about an axis of rotation A, e.g. coaxial to the cylindrical cavity of the channel 13.

Preferably, the auger 15 is adapted to connect the access portion 1341,1342 of the channel 13 with the second outlet mouth 135 thereof for transporting the solid fraction, which accumulates at the access portion 1341,1342, from the access portion itself towards the second outlet mouth 135.

The auger 15 is for example coaxially inserted into the channel 13, so as to longitudinally cross the channel itself, for the entire length thereof.

Preferably, the auger 15 extends longitudinally from the access portion 1341, 1342 to the second outlet mouth 135.

For example, the auger extends longitudinally (along the axis of rotation A thereof) from an axial upstream end (in the advancement direction imposed on the residual solids transported by the auger 15 by the screwing rotation of the auger 15 itself) to an opposing axial downstream end (in the advancement direction imposed on the residual solids transported by the auger 15 by the screwing rotation of the auger 15 itself).

Preferably, the axial downstream end of the auger 15 exits axially from the second outlet mouth 135 for a (limited) axial stretch projecting to the outside of the channel 13.

For example, the projecting axial stretch comprises one or two end spirals of the auger 15.

The auger 15 is for example an auger without a central shaft, in practice it comprises only one helix (or more) delimiting a substantially cylindrical central (empty) cavity.

However, it is not excluded that the auger 15 can have a full length central shaft, as known to a person skilled in the art.

The auger 15, although being a monolithic single body, can ideally be divided into more portions, based on the axial position and the positioning thereof in the channel 13.

In practice, the auger 15 has a first portion 151 (e.g. intermediate) placed inside the first stretch 131 of the channel 13.

The first portion 151 of the auger 15 in practice has an equal length to the length of the first stretch 131 of the channel 13.

Furthermore, the auger 15 comprises a second portion 152 (e.g. proximal to the axial upstream end of the auger itself) placed inside the second stretch 132 of the channel 13.

The second portion 152 of the auger 15 in practice has an equal length to the length of the second stretch 132 of the channel 13.

At the first portion 151 and/or the second portion 152 the auger 15 can comprise radial brushes, e.g. mounted in sectors and bolted or however fixed removably to the auger 15.

In practice, the radial brushes are adapted to radially project the spiral of the auger 15, in practice by entering into brushing contact with the bottom (of the first stretch 131 and/or the second stretch 132) of the channel 13.

The auger 15 then comprises a third portion 153 (e.g. proximal to the axial downstream end of the auger itself), placed on the opposite side of the second portion 152 with respect to the first portion 151, which is placed inside the third stretch 133 of the channel 13.

The third portion 153 of the auger 15 in practice has an equal (or slightly higher, as specified above) length to the length of the third stretch 133 of the channel 13.

The auger 15 has, for example, a variable section along the longitudinal axis thereof.

In the example, the first portion 151 and/or the second portion 152 have a smaller diameter (e.g. outer diameter) than the (outer) diameter of the third portion 153.

In the example shown, the auger 15 is implemented by an internal helix that extends along the entire length (first, second and third portion 151,152,153) of the auger 15 that is fixed (or however integral) to an external helix that extends along the third stretch only 153.

In practice, the first portion 151 and the second portion 152 of the auger 15 are inserted with abundant radial clearance into the respective first stretch 131 and second stretch 132 of the channel 13.

The third portion 153 of the auger 15 is inserted with reduced radial clearance into the third stretch 133 of the channel 13.

The device 10 comprises a motor unit 30 configured to activate the auger 15 in rotation. In particular, the motor unit 30 is placed at or in proximity to the axial downstream end of the auger 15 and connected thereto to draw the auger 15 in rotation about the axis of rotation A thereof.

The motor unit 30 comprises a motor 31, e.g. an electric motor, which is provided with a drive shaft 310 being rotatable about a central axis of revolution thereof, which is in the example parallel and eccentric to the axis of rotation A of the auger 15.

The motor unit 30 further comprises a reducer 32, which is in turn provided with an input shaft 320 (e.g. hollow), which is coaxially (directly) coupled rigidly to (for example fitted onto) the drive shaft 310 of the motor 31, and an output shaft 321.

The output shaft 321 is rotatable about a central axis of revolution B thereof which is parallel and eccentric with respect to the central axis of revolution of the input shaft 320 (and therefore of the drive shaft 310).

Furthermore, the axis of revolution B of the output shaft 321 is parallel and eccentric to the axis of rotation A of the auger 15.

The motor unit 30 is preferably (a gear motor) comprised of the motor 30 and the gear motor 32 and, the output shaft 321 of the reducer 32 is the (only) output shaft of the motor unit 30 (as a whole).

It is not excluded however that the motor unit 30 may be comprised only of the motor 30, in which case the drive shaft 310 constitutes only the output shaft of the motor unit 30 (as a whole).

For example, the motor unit 30 is arranged to the side of the axial downstream end of the auger 15, so that the output shaft 321 is substantially flanked and parallel to the axial projecting stretch of the auger 15 (which projects axially outside the axial downstream end of the channel 13), e.g. at a non-null radial distance therefrom.

The device 10 further comprises a transmission unit 40 which is configured to transmit the rotational motion from the motor unit 30, i.e. from the output shaft 321 thereof, to the auger 15.

In practice, the transmission unit 40 connects the output shaft 321 to the auger 15, preferably to the axial projecting stretch of the auger 15.

The transmission unit 40 comprises a pinion 41, which is (directly) rigidly connected coaxially to the output shaft 321 of the motor unit 30, i.e. fitted onto the output shaft 321 itself.

In detail, the pinion 41 is rotatable about a central axis thereof coinciding with the axis of revolution B of the output shaft 321 (drawn in rotation by the latter).

Again, the transmission unit 40 comprises a toothed crown 42 which is configured to mesh with the pinion 41.

The toothed crown 42 is (directly or indirectly) rigidly connected coaxially to the auger 15, as will be better described below.

In detail, the toothed crown 42 is rotatable about a central axis thereof coinciding with the axis of rotation A of the auger 15 (so as to be able to draw the latter in motion).

In the example shown, the pinion 41 (directly) meshes with the toothed crown 42, i.e. the pinion 41 has a plurality of teeth that mesh with the teeth of the toothed crown 42. Furthermore, the toothed crown 42 has a greater number of teeth (and diameter) than the number of teeth (and diameter) of the pinion 41.

In this way, the transmission unit 40 operates a (further) reduction of the rotation speed of the auger 15 (with respect to that operated by the reducer 32).

It is not excluded however that the pinion 41 may directly mesh with the toothed crown 42, i.e. for example that one or more intermediate toothed wheels are interposed between the pinion 41 and the toothed wheel 42 and/or that a transmission member, e.g. chain operated, is interposed between the pinion 41 and the toothed wheel 42 for the transmission of the rotational motion of the pinion 41 to the toothed wheel 42.

Furthermore, it is possible to provide for the transmission unit 40 to have a pair of pulleys connected to one another by a drive belt in the place of the pinion 41 and the toothed crown 42.

The toothed crown 42 has an inner cylindrical cavity, coaxial with the central axis thereof, which is inserted (with radial clearance) coaxially on the auger 15, i.e. on the projecting axial stretch thereof.

For example, the toothed crown 42 is inserted coaxially on the (projecting axial) stretch proximal to the axial downstream end of the auger 15 at a non-null distance from the axial downstream end of the auger 15 itself (for example, at a distance substantially less than or equal to axial length of a spiral of the auger 15 itself and, for example, greater than one half of the axial length of a spiral of an auger 15).

The toothed crown 42 can be made of a single body or, as in the example, made of a circumferential union of a plurality of separate/separable circumferential sectors.

The transmission unit 40 further comprises a connection flange 43 configured to mutually fix, or to rigidly connect, the toothed crown 42 and the auger 15.

The connection flange 43 comprises, in detail, a connection tube 430 (or connection pipe), substantially cylindrical, which has a central axis arranged coaxially with the auger 15 and the toothed crown 42.

In the example, the connection tube 430 has an inner cylindrical cavity, coaxial with the central axis thereof, which is inserted (with reduced or null radial clearance) coaxially on the auger 15, i.e. on the projecting axial stretch thereof, in other words on the (projecting axial) stretch proximal to the axial downstream end of the auger 15 at a non-null distance from the axial downstream end of the auger 15 (for example, at a distance substantially less than or equal to the axial length of a spiral of the auger 15 itself).

In practice, the axial downstream end of the auger 15 projects axially beyond the proximal axial end of the connection tube 430 (and of the toothed crown 42) by a non-null axial distance, for example less than or equal to the axial length of a spiral of the auger 15 itself, i.e. a pitch of the auger 15). Preferably, the connection tube 430 has an axial length substantially comprised between a quarter (¼) of the pitch of a spiral and one (1) pitch of a spiral of the auger 15 (or in any case less than or equal to a pitch of a spiral), wherein the pitch of the spiral essentially means the axial length of a spiral of the auger 15.

Advantageously, the connection tube 430 has an axial length comprised between one third (⅓) of the pitch of a spiral and one half (1½) of the pitch of a spiral of the auger 15 (or in any case less than or equal to one half of the pitch of a spiral).

Alternatively or in addition, the connection tube 430 has an axial length less than the external diameter (maximum) of the auger 15, for example less than ⅓ (one third) of the external diameter (maximum) of the auger 15.

The aforesaid relative dimensioning between the auger 15 and the connection tube 430 is designed to allow the correct (and constant) axial advancement of the solid fraction transported by the auger 15 towards the axial downstream end thereof, preventing and/or limiting at most the risk of clogging (at the stretch affected by the connection tube 430) which would generate malfunctions or need for maintenance and/or restoration interventions of the discharge flow for the device 10.

Again, the connection tube 430 has an outer barrel, which has at least one cylindrical stretch coaxial with the central axis thereof, which cylindrical stretch is inserted (with reduced or null radial clearance) coaxially into the internal cylindrical cavity of the toothed crown 42.

In the cylindrical stretch there is a plurality of radial through holes, each having its own substantially radial through axis (i.e. all converging onto the central axis of the connection tube 430), which are for example aligned along a helical trajectory, with the same pitch as the pitch of the auger 15 (and for example spaced out from each other by a predetermined angular distance, that is preferably constant).

Furthermore, the connection tube 430 comprises at least one crest 432 projecting in the radial direction to the outside of the connection tube itself, i.e. projecting radially towards the outside of the cylindrical stretch of the outer barrel of the connection tube.

The crest 432 is for example a central crest, i.e. axially interposed between the opposing axial ends of the connection tube 430.

Figure 9:
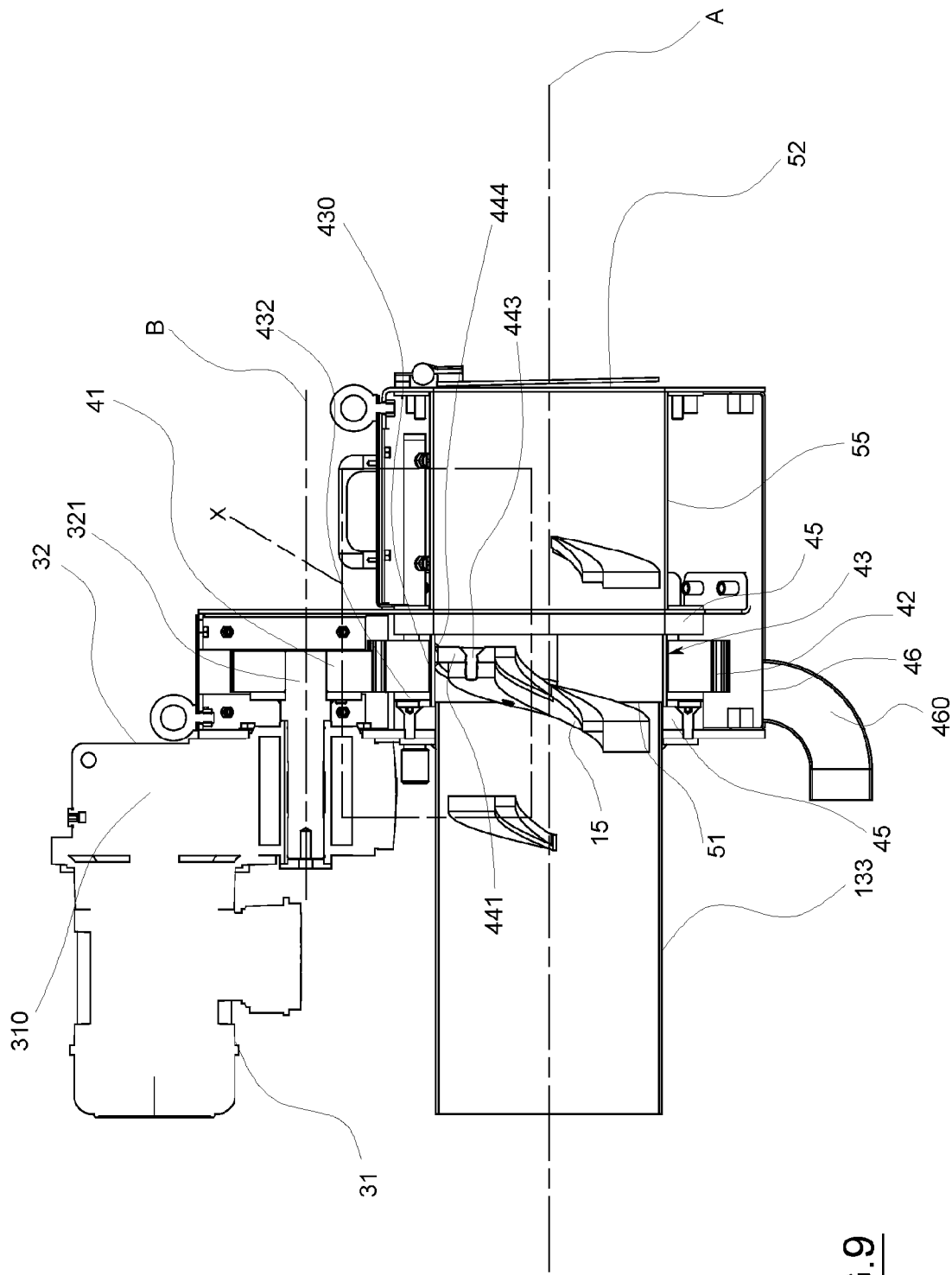
FIG. 9 is an enlargement of the detail VII of FIG. 6, according to a further embodiment.
Figure 10:
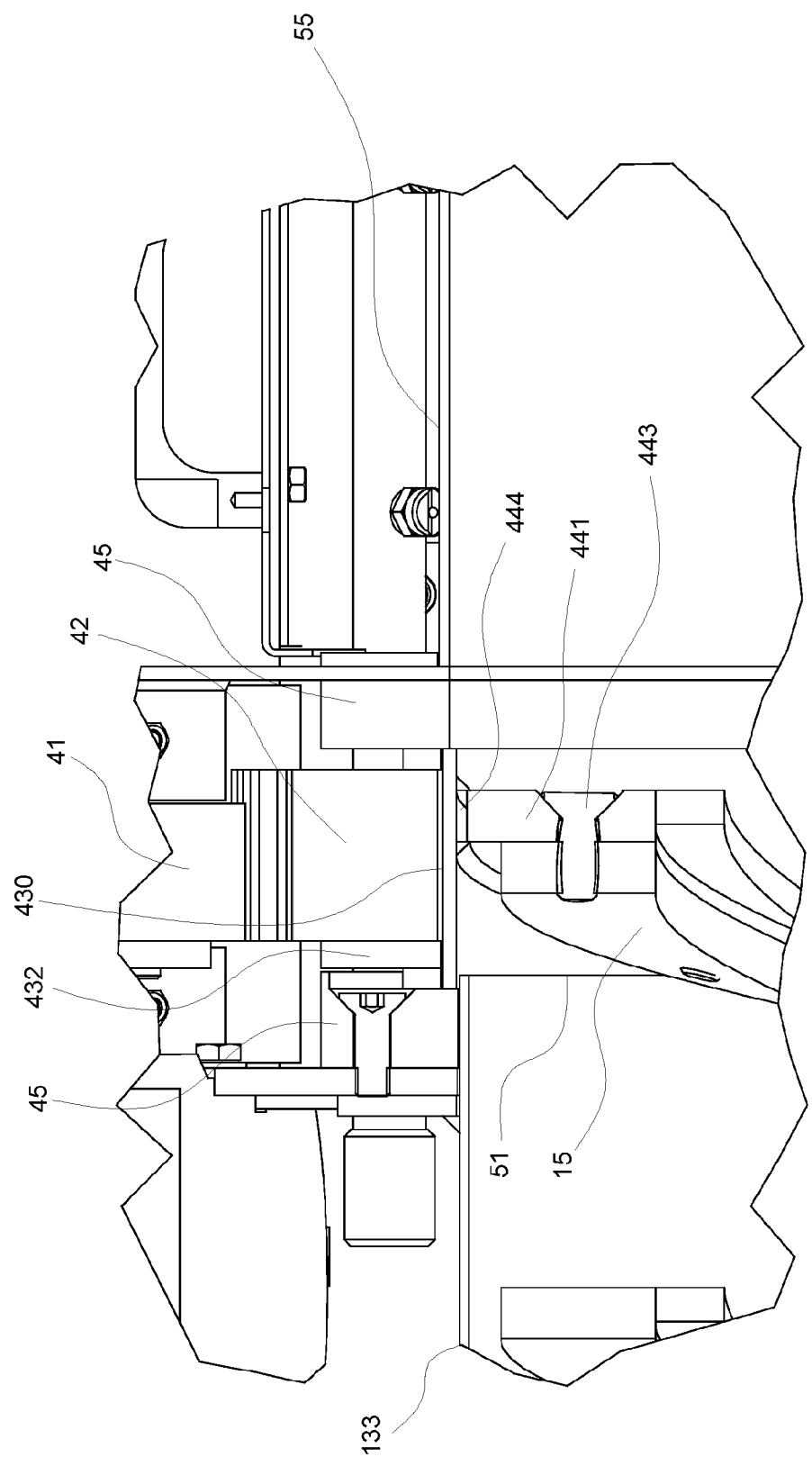
FIG. 10 is the enlargement of the detail X of FIG. 9.

It is not excluded that the crest 432, as illustrated in FIGS. 9 and 10, may be arranged in proximity to a (single) axial end of the connection tube 430, for example proximal or at the axial end of the connection tube 430 facing towards the upstream axial end of the auger 15.

The crest 432 defines an axial face which is substantially planar and lying on an orthogonal plane to the central axis of the connection tube 430.

The radial height of the crest 432 is greater than the difference between the inner radius of the inner cylindrical cavity of the toothed crown 42 and the outer radius of the cylindrical stretch of the outer barrel of the connection tube 430.

In practice, the crest 432 (or the axial face thereof) defines an axial support shoulder for the toothed crown 42, when this is fitted axially onto the cylindrical stretch of the connection tube 430.

Furthermore, the radial height of the crest 432 is less than the (minimum) outer diameter of the toothed crown 42, i.e. so as not to project radially beyond the latter i.e. to be comprised within the radial dimension thereof.

The crest 432 has at least one axial through hole, which has the through axis thereof parallel to the central axis of the connection tube 430.

The crest 432 (i.e. the axial face thereof) may be an annular crest (or face) around the entire circumference of the connection tube 430 or, alternatively, may be formed by a plurality of discontinuous circumferential stretches, wherein for example the axial face of each circumferential stretch is coplanar with the axial face of the other circumferential stretches (and has a respective axial through hole).

In the example, the connection tube 430 can comprise two further crests 433 (parallel to the central crest 432) which are arranged at the respective axial ends of the connection tube.

The radial height of the two further crests 433 is less than the radial height of the crest 432.

Alternatively, as illustrated in FIGS. 9 and 10, the connection tube 430 could have, as the only crest, the aforesaid crest 432.

Said crest 432 can be made as a single body with the connection tube 430 or be permanently fixed thereto (for example by welding or by interference) or in a releasable way (for example by means of a threaded connection or the like).

The transmission unit comprises a first connection which is configured to rigidly fix the auger 15 to the connection tube 430.

The first connection, in a first embodiment shown in FIGS. 1-8, comprises (or consists of) a first threaded connection which is configured to rigidly fix the auger 15 to the connection tube 430, in a releasable way.

In this case, the first threaded connection comprises a plurality of radial screws 440 configured to be inserted into the radial through holes made in the connection tube 430.

Alternatively, like in the embodiment shown in FIGS. 1-6 and 9-10, the first connection comprises (or consists of) a first welded connection 444 (or a weld), which is configured to rigidly fix the auger 15 to the connection tube 430, permanently.

In this case, the connection tube 430 may not have the aforesaid radial through holes, but may be substantially full and free of holes.

In particular, the first connection also comprises one or more connection blocks 441, which are individually fixed inside the connection tube 430.

For example, in the case in which the first connection is defined by the first threaded connection, the connection blocks 441 are placed at radial through holes t (where provided) by means of said radial screws 440.

Each connection block 441 defines an internal axial shoulder for a respective stretch of the auger 15, i.e. of the projecting axial stretch thereof (inserted into the connection tube 430).

The first connection then comprises first axial screws 443 (illustrated only in FIGS. 9 and 10) inserted axially into axial holes made in each of the connection blocks 441 and screwed onto threaded axial holes made in the (projecting axial stretch of the) auger 15. In practice, each connection block 441 is placed in contact with a respective stretch of the auger 15 to which it is fixed through such first axial screws 443.

It is not excluded that, alternatively, the radial screws 440 are adapted to directly fix the auger 15 to the connection tube 430 for example by passing through the radial through holes and screwing into the radial threaded holes on the outer crest of the auger 15. For example, the connection blocks 441 have at least one surface (of contact with the auger 15) shaped like a stretch of helicoid, i.e. adapted to match the surface of the auger 15 with which it is in contact.

Preferably, the connection blocks 441 are defined by one or more stretches of a further (helical) auger, which defines a portion of the drive auger.

Said connection blocks 441 (defining the drive auger) have, for example, the same pitch as the auger 15 (i.e. the stretch of the auger 15 to which they are fixed) and preferably the same internal diameter.

Advantageously, the connection blocks 441 (defining the drive auger) have an external diameter (slightly) greater than the external diameter of the auger 15 (i.e. the stretch of the auger 15 to which they are fixed).

The connection blocks 441 can be spaced along the helical profile they define (defining separate stretches of helicoid) or can be joined together to form a single continuous helical stretch.

The connection blocks 441, for example, extend on an axial stretch of the auger 15 less than or equal to the axial length of the connection tube 430.

The transmission unit 40 further comprises a second connection, for example a second threaded connection, which is configured to (directly and) rigidly fix the toothed crown 42 to the connection tube 430, i.e. to the crest 432 thereof.

The second threaded connection comprises a plurality of second axial screws 445, which are inserted axially inside axial through holes made in the crest 432 and screwed onto axial through holes made in the toothed crown 42 (or in each circumferential sector thereof).

In practice, the radial face of the crest 432 is placed in contact with (a respective circumferential sector of) the toothed crown 42 to which it is fixed through such second axial screws 445.

The device 10 further comprises a containment housing 50 which is configured to contain the transmission unit 40 and/or the projecting axial stretch of the auger 15, i.e. the proximal stretch of the auger 15 and comprising the axial downstream end thereof, (and support the motor unit 30).

The containment housing 50 has a substantially box-like shape defined by a plurality of walls delimiting an (empty) internal volume.

In particular, the containment housing 50 has an axial extension along a longitudinal axis that is substantially parallel and concentric to the longitudinal axis of the channel 13; in detail, the containment housing 50 axially extends the channel 13, as will be better described below, on the side of the axial downstream end thereof.

The containment housing 50 comprises a first axial wall, in which an access mouth 51 is obtained, e.g. circular, and a second wall, in which a discharge mouth 52 is obtained, e.g. also circular.

In the example illustrated, the second wall is an axial wall axially opposing the first wall and, for example, the discharge mouth 52 is axial, i.e. orthogonal to the longitudinal axis (or orthogonal to the axis of rotation of the auger 15).

For example, the discharge mouth 52 is closed (in an openable way, for example spontaneously) by a hatch, for example tilting (hinged with respect to an axis orthogonal to the axis of the auger 15 placed above the hatch itself).

It is not excluded that the discharge mouth 52 and/or the second wall is arranged (at the bottom) in the radial direction with respect to said longitudinal axis.

Therefore, the containment housing 50 comprises a side wall, e.g. box-like, that joins together the first wall and the second wall delimiting, inside it, a containment environment.

The first wall is fixed, for example through axial fixing screws, rigidly (and directly) to (a fixing flange that surrounds) the axial downstream end of the channel 13, so that the access mouth 51 is actually coaxial and facing the second outlet mouth 135 of the channel 13.

In particular, the access mouth 51 is fitted onto the projecting axial stretch of the channel 13 of the auger 15, so that the latter is (contained totally) inside the containment housing 50.

The containment housing 50 comprises a first axial (upstream) stretch proximal to the channel 13, which is axially delimited by the first wall provided with the access mouth 51, which defines a first (axial) portion of the containment environment, in which the aforesaid projecting axial stretch of the auger 15 is contained and the transmission unit 40 (in its entirety).

In practice, the first portion of the containment environment is axially delimited (upstream) by the first wall and in the circumferential direction by an axial (enlarged) portion of the side wall.

The first portion of the containment environment is then axially delimited by an opposing intermediate wall to the first wall and surrounding in the circumferential direction the downstream free end of the auger 15 (and of the connection tube 430).

The first portion, in practice, is divided (radially) into two compartments, of which a first radially internal compartment, which contains the auger 15, i.e. the projecting axial stretch thereof, and a second compartment, radially external, which contains the transmission unit 40.

In practice, the first compartment and the second compartment are separated radially (and axially) by the connection flange 43, i.e. by the connection tube 430 thereof; e.g. the first compartment is placed inside the connection tube 430 and the second compartment is placed outside the connection tube 430.

The device 10 further comprises sealing gaskets 45 configured to keep the first compartment and the second compartment separate.

In detail, the device 10 comprises a pair of gaskets 45, preferably annular, arranged axially on opposite sides with respect to the connection flange 43 (i.e. the connection tube 430) and that are respectively interposed between an axial end of the connection flange 43 (i.e. of the connection tube 430) and a wall that delimits the first compartment (and the second compartment).

In detail, a first (annular) gasket 45 is fixed (for example through screws) inside the first wall coaxially to the access mouth 51 so as to delimit it perimetrally.

The first gasket 45 is configured to be interposed (compressed and/or in contact) between the first wall and the axial face (turned towards the axial upstream end of the auger 15) of one of the further crests 433 of the connection tube 430.

Again, a second (annular) gasket 45 is fixed (e.g. through screws) inside the intermediate wall of the containment housing 50 opposing the first wall and surrounding in the circumferential direction the free downstream end of the auger 15 (and of the connection tube 430), so as to be coaxial to the first gasket and to face it.

The second gasket 45 is configured to be interposed (compressed and/or in contact) between the intermediate wall and the axial face (turned towards the axial downstream end of the auger 15) of one of the further crests 433 of the connection tube 430.

The gaskets 45, in practice, sealingly divide the first compartment and the second compartment, preventing any mutual contamination.

The portion of side wall that surrounds the first compartment can provide a (radial) discharge hole 46 serving a discharge conduit 460 of the liquid phase transported by the auger 15 (together with the solid phase) inside the containment housing 50. Furthermore, the portion of first wall surrounding the second compartment can have an eccentric passage hole separate from the access mouth 51, in which the output shaft 321 (of the reducer 32) of the motor unit 30 is inserted.

The containment housing 50 comprises a second axial (downstream) stretch proximal to the channel 13, which is axially delimited by the second wall provided with the outlet mouth 52, which defines a second (axial) portion of the containment environment.

In practice, the second portion of the containment environment is axially delimited (downstream) by the second wall and in the circumferential direction by an axial (tapered) portion of the side wall and axially (upstream) by the intermediate wall (and/or by the second gasket 45) surrounding in the circumferential direction the free downstream end of the auger 15 (and of the connection tube 430).

The second portion, in practice, delimits a third compartment, which axially extends the first compartment.

The device 10 can comprise a final compacting screen 55 (see FIG. 4 and FIGS. 7-8 and 9-10), which is configured to compact the solid fraction discharged through the discharge mouth 52 (and/or reduce the quantity of liquid fraction contained therein).

The final compacting screen 55 is placed inside the protection casing 50, for example in the third compartment, (coaxially) upstream of the discharge mouth 52.

Preferably, the final compacting screen 55 comprises (or consists of) a filtering sleeve (for example made of mesh, preferably metallic), preferably with tubular shape, for example cylindrical.

For example, the final compacting screen 55 is inserted (with reduced radial clearance) coaxially on the end stretch of the auger 15 (which projects axially beyond the connection tube 430) provided with the axial downstream end thereof.

The auger 15 (i.e. the terminal stretch thereof inserted inside the final compacting screen 55) affects a limited axial stretch of the final compacting screen 55, i.e. it extends over a limited axial stretch, preferably not greater than the half of the axial length of the final compacting screen 55 itself.

Preferably, the axial stretch of the final compacting screen 55 not occupied axially by the auger 15 has a length substantially equal to one (1) pitch of the spirals of the auger 15 itself.

The overall length of the final compacting screen 55, for example, is substantially equal (or slightly greater than) to 1.5 times the pitch of the spirals of the auger 15.

In practice, the final compacting screen 55 has an upstream end inserted on the terminal stretch of the auger 15 projecting axially beyond the connection tube 430 and an opposed free downstream end, which is placed for example at or in proximity to the discharge mouth 52 (for example substantially coinciding therewith).

The upstream end of the final compacting screen 55 substantially defines an access mouth of the third compartment.

The final compacting screen 55 in fact divides (radially) the third compartment in which it is located into two separate environments, of which:
- a first (radially internal) environment in communication with the upstream end of the final compacting screen 55 (i.e. the access mouth of the third compartment from which the solid fraction transported by the auger 15 enters the third compartment itself) and with the downstream end of the final compacting screen 55 (i.e. the discharge mouth 52, from which the more compacted solid fraction, i.e. more squeezed, leaves the third compartment to be discharged from the device 10); and
- a second (radially external) environment for the collection and discharge of the leachate, in fluid communication with (or provided with) the discharge hole 46 and/or the discharge conduit 460 of the residual liquid fraction (leachate), from which it is removed by the containment casing 50.

The final compacting screen 55 defines radial openings (on the filter sleeve) from which the residual liquid phase (leachate) possibly present in the solid fraction (already) separated by means of the auger 15 (keeping the solid fraction in its inside) radially exits allowing to obtain a high squeezing degree of the solid fraction.

The holes of the final compacting screen 55 (i.e. the filtration gap of the final compacting screen 55) have dimensions substantially comprised between 0.5 mm and 10 mm, preferably comprised between 3 mm and 5 mm.

Preferably, the compacting screen 55 is fixed with respect to the auger 15, i.e. it is (rigidly) fixed to the support frame 11 (or preferably it is rigidly fixed to the containment casing 50, for example in a removable way (preferably by bolting).

In practice, the terminal portion of the auger 15 which is axially inserted inside the axial stretch of the final compacting screen 55, with its revolution motion around the axis of rotation of the auger 15, exerts a scraping and/or transport/compaction action of the solid fraction inside the final compacting screen 55 which allows:

a) the discharge (when suitably squeezed) from the discharge mouth 52; and b) the effective squeezing and separation of the liquid fraction still present therein which is discharged by means of the discharge hole 46.

It has been observed that the relative motion between the auger 15 and the final compacting screen 55 allows the effective axial advancement of the solid fraction (without this being clogged in the third compartment) and the continuous and effective squeezing of the same.

The device 10 can comprise a separation unit of the solid fraction from the liquid fraction.

The separation unit is generally placed upstream of the auger 15, i.e. inside the box-like body 12 described above.

The separation unit comprises, for example, a first filtering baffle 16 associated with the support frame 11 so as to intercept the fluid that flows from the inlet mouth 121 to the first outlet mouth 125 and configured so as to withhold and accumulate a part of the solid fraction at at least a first surface 161 of the first filtering baffle 16, e.g. placed inside the box-like body 12.

The first filtering baffle 16 has a tubular shape with a larger diameter than the outer diameter of the auger 15 and the channel 13 and is inserted, e.g. coaxially, onto the first portion 151 of the auger itself.

The inner surface 161 of the first filtering baffle 16 is, in practice, facing (radially and/or vertically aligned to) the first portion 151 of the auger 15.

The first filtering baffle 16 is supported at the opposite ends by the first wall 120 and by the second wall 122 of the box-like body 12.

In practice, the first filtering baffle 16 has an axial length substantially equal to the distance between the first wall 120 and the second wall 122 of the box-like body 12.

The first filtering baffle 16 is rotatably associated with respect to its own axis about the first stretch 131 of the channel 13.

In practice, between the second wall 122 of the box-like body 12 and the upper end of the first filtering baffle 16 a swivel ring 17 is interposed adapted to rotatably constrain the first filtering baffle 16 to the support frame 11.

The first filtering baffle 16 comprises at least one collection and accumulation shovel 162 of the solid fraction that is fixed onto the inner surface 161.

The shovel 162 has a substantially equal length to the length of the first filtering baffle 16 and, for example, is placed with a longitudinally parallel axis to the axis of the first filtering baffle itself.

However, it is not excluded that the shovel 162 can have a helical extension or may be inclined with respect to the axis of the first filtering baffle 16.

The shovel 162 can be substantially radial or preferably, as in the example, have an inclination with respect to the radial direction of an acute angle, substantially equal to (or around) 30° forwards with respect to the rotation direction of the first filtering baffle 16.

The first filtering baffle 16 comprises a plurality of shovels 162 distributed and distanced (e.g. equidistant and/or parallel) along the inner surface 161.

The first filtering baffle 16 comprises a first plurality of through holes, e.g. uniformly distributed along the cover thereof.

The holes are configured so as to withhold the solid fraction and let the liquid fraction of the fluid that passes from the inlet mouth 121 towards the outlet mouth 125 flow out.

A further motor 170 is associated with the top end of the first filtering baffle 16 (e.g. associated with a gear motor and motion transmission means like a series of gears or a belt-pulley coupling) adapted to activate in rotation the first filtering baffle 16 about the axis thereof.

The motor 31 and the further motor 170 are independent from each other.

It is not excluded that the motor 31, with appropriate motion transmission members, may be able to place in rotation both the auger 15 and the first filtering baffle 16.

The separation unit can further comprise a second filtering baffle 18 associated with the support frame 11 so as to intercept the fluid that flows from the inlet mouth 121 to the first outlet mouth 125.

The second filtering baffle 18 is placed upstream of the first filtering baffle 16 in the advancement direction of the fluid from the inlet mouth 121 to the first outlet mouth 125 and is configured so as to withhold and accumulate a part of the solid fraction at at least a concave surface 181 thereof.

The second filtering baffle 18 comprises at least a part inserted into the first filtering baffle 16, e.g. interposed radially between the first filtering baffle 16 and the auger 15.

The second filtering baffle 18 has a substantially truncated cone shape, with a larger outer and inner diameter than the outer diameter of the auger 15 and of the channel 13. The second filtering baffle 18 is inserted, for example coaxially, onto the second portion 152 of the auger itself with concavity facing towards the free end of the auger 15, i.e. the end of the auger 15 placed at the inlet mouth 121 and for example projecting outside the box-like body 12.

In practice, the enlarged end of the second filtering baffle 18 is radially aligned on an intermediate stretch (or proximal to the free end) of the second portion 152 of the auger 15.

The tapered end of the second filtering baffle 18 is radially aligned and fitted onto the end of the second portion 152 of the auger 15 constrained to the first portion 151, i.e. in the joining area between the first portion 151 and the second portion 152 of the auger 15 (more in particular, in the joining area between the first stretch 131 and the second stretch 132 of the channel 13).

It is not excluded that the second filtering baffle 18 can equivalently be substantially disc- or tube-shaped or be a combination of the two, according to requirements.

The second filtering baffle 18 is adapted to obstruct the bottom open end of the first filtering baffle 16, substantially intercepting the inlet mouth 121.

In the example, the second filtering baffle 18 is fixed to the first filtering baffle 16, e.g. the enlarged end of the second filtering baffle 18 is fixed to the lower free end of the first filtering baffle 16, e.g. through bolted flanges.

The concave surface 181 of the second filtering baffle 18 is, in practice, facing (radially and/or vertically aligned to) the second portion 152 of the auger 15.

The second filtering baffle 18 has a substantially shorter axial length than the axial length of the first filtering baffle 16, e.g. substantially equal to ¼ of the axial length of the first filtering baffle 16.

The second filtering baffle 18 is rotatably associated with respect to its own axis about the second stretch 131 of the channel 13.

In the example, the second filtering baffle 18 is drawn in rotation, e.g. by the second motor 170, through the first filtering baffle 16 (which are solidly associated in rotation). However, it is not excluded that a further independent motor can directly draw in rotation the second filtering baffle 18 which can be unconstrained from the first filtering baffle 16.

The second filtering baffle 18 comprises at least one collection and accumulation shovel 182 of the solid fraction that is fixed onto the concave surface 181.

The shovel 182 has a substantially equal length to the length of a generatrix of the second filtering baffle 18 and, for example, is placed with its longitudinal axis parallel to the axis of the second filtering baffle itself.

However, it is not excluded that the shovel 182 can have a helical extension or be inclined with respect to the axis of the second filtering baffle 18.

The shovel 182 can be substantially radial or preferably, as in the example, have an inclination with respect to the radial direction of by acute angle, substantially equal to (or around) 30° forwards with respect to the rotation direction of the second filtering baffle 18.

The second filtering baffle 18 comprises a plurality of shovels 182 distributed and distanced (e.g. equidistant and/or parallel) along the concave surface 181.

The second filtering baffle 18 comprises a first plurality of through holes, e.g. uniformly distributed along the cover thereof.

In particular, the holes place in communication the concave surface 181 with the internal volume of the first filtering baffle 16.

The holes are configured so as to withhold the (coarse) solid fraction and let the liquid fraction of the fluid that passes from the inlet mouth 121 (inside the first filtering baffle 16 and from this) towards the outlet mouth 125 flow out.

The holes in the second filtering baffle 18 are larger than the holes of the first filtering baffle 16.

The device 10 further comprises at least one annular gasket 19 adapted to surround the inlet mouth 121 and substantially sealingly connect the inlet mouth 121 with at least one from between the first filtering baffle 16 and the second filtering baffle 18.

In the example, the annular gasket 19 comprises a flexible lip a first end of which is fixed along the entire (internal) perimeter of the inlet mouth 121 and the second free end of which is adapted to rest in a forced way on the outer perimeter portion of the concave surface 182 of the second filtering baffle 18 (e.g. at a bolted flange that constrains the first filtering baffle 16 to the second filtering baffle 18).

In practice, the annular gasket 19, as well as keeping the connection between the environment outside the box-like body 12 and the inside thereof watertight, so that the fluid being filtered enters the box-like body 12 only through the second filtering baffle 18, is adapted to fluid-dynamically divide the first filtering baffle 16 from the second filtering baffle 18 itself (e.g. cooperating with a fixing flange that physically joins the first filtering baffle 16 to the second filtering baffle 18).

It is observed that the two environments into which the collection channel 1 is divided by the device 10, i.e. the first environment communicating with the inlet of the fluid to be separated placed upstream of the device 10 (in which the fluid itself to be separated is contained) and the second environment placed downstream of the device 10 and communicating with the outlet of the liquid fraction separated from the fluid in separation (containing only the liquid fraction of the fluid itself), are only in fluid communication through (in sequence) the second filtering baffle 18 and the first filtering baffle 16 which during the passage of the fluid being filtered from the first environment to the second environment withhold a respective solid fraction that is transported, through the auger 15, to the second outlet mouth 135.

The device 10 comprises at least one cleaning unit 21,22 of at least one from between the first filtering baffle 16 and the second filtering baffle 18.

In the example, the device 10 comprises a first cleaning unit 21 of the first filtering baffle 16 and a second cleaning unit 22 of the second filtering baffle 18.

The first cleaning unit 21 comprises a first bar 210 provided with a plurality of dispensing nozzles of a washing fluid, e.g. a portion of fluid collected—through derivation means such as pumps and conduits not shown in the figure—from the same collection channel 1, in the environment thereof placed downstream of the device 10 (i.e. in the environment in which the "clean" liquid fraction of the fluid is contained).

The first bar 210 is for example placed outside the first filtering baffle 16, with the nozzles facing towards the surface of the first filtering baffle 16 opposite the inner surface 161, e.g. fixed to the support frame 11.

The first bar 210 has a length for example a substantially equal length to the length of the first filtering baffle 16 and is fixed, for example, with a longitudinally parallel axis to the axis of the first filtering baffle 16 itself.

In particular, the first bar 210 has the opposite ends fixed respectively to the first wall 120 and to the second wall 122 of the box-like body 12.

For example, the first cleaning unit 21 comprises a plurality of said first bars 210 spaced out from each other (e.g. equidistant and/or parallel).

The first cleaning unit can further comprise a brush 211 (or more) placed outside the first filtering baffle 16, so as to enter into brushing contact with the surface of the first filtering baffle 16 opposite the inner surface 161.

The brush 211 is for example fixed to the support frame 11.

The brush 211 has a length for example a substantially equal length to the length of the first filtering baffle 16 and is fixed, for example, with a longitudinally parallel axis to the axis of the first filtering baffle 16 itself (e.g. interposed between two first bars 210).

In particular, the brush 211 has the opposite ends fixed respectively to the first wall 120 and to the second wall 122 of the box-like body 12.

The second cleaning unit 22 comprises a second bar 220 provided with a plurality of dispensing nozzles of a washing fluid, e.g. a portion of fluid collected—through derivation means such as pumps and conduits not shown in the figure—from the same collection channel 1, in the environment thereof placed downstream of the device 10 (i.e. in the environment in which the "clean" liquid fraction of the fluid is contained).

The second bar 220 is for example placed outside the second filtering baffle 18 (and inside the first filtering baffle 16), with the nozzles facing towards the convex surface of the second filtering baffle 18 opposite the concave surface 181, e.g. fixed to the support frame 11 (in particular to the channel 13, at the first stretch 131 thereof).

The second bar 220 has a length for example a substantially equal length to the length of a generatrix of the second filtering baffle 18 and is fixed, for example, with a longitudinally parallel axis to the axis of the second filtering baffle 18 itself.

In particular, the second bar 220 has an end constrained to the channel 13 (at the joining zone between the first stretch 131 and the second stretch 132 thereof) and the opposite end free.

For example, the second cleaning unit 22 comprises a plurality of said second bars 220 spaced out from each other (e.g. equidistant and/or parallel).

In light of the above, the operation of the device 10 is as follows.

The fluid to be separated is conveyed into the collection channel 1 at the first end 1*a* thereof and is pushed (e.g. by gravity or forced by the same inertia of the fluid and by pumping means) towards the second end 1*b*.

In practice, the fluid to be separated is compelled and forced to enter the device 10 through the inlet mouth 121 thereof.

Once the inlet mouth 121 has been crossed, the fluid being treated meets the second filtering baffle 18, which withholds a part of the solid fraction, the coarse part, letting the liquid fraction flow out, together with a fine solid fraction, in the environment placed downstream of the second filtering baffle 18 in the crossing direction of the fluid, i.e. into the volume interposed between the second filtering baffle 18 and the first filtering baffle 16.

The axial upstream end of the auger 15 is adapted to come into contact with the coarse solid fraction which is gradually loaded and accumulated inside the channel 13.

In practice, the rotation of the auger 15 transports the solid coarse fraction from the axial upstream end of the auger 15 axially towards the axial downstream end thereof to then be discharged at the discharge mouth 52.

The third compartment is, with the exception of the final compacting screen 55, free from axial dimensions (e.g. there are no shafts or supports of the auger 15 or other bulky elements therein) that prevent the (natural) discharge of the solid fraction (even when particularly fibrous) from the discharge mouth 52.

The invention thus conceived can undergo numerous modifications and variants all of which are covered by the inventive concept.

Moreover, all the details can be replaced by other technically equivalent elements. In practice, the materials used, as well as the contingent shapes and sizes, can be whatever according to the requirements without for this reason departing from the scope of protection of the following claims.

The invention claimed is:

1. A device for transporting solids that comprises:
   a support frame,
   an auger connected to the support frame rotatably about an axis of rotation,
   a motor unit configured to activate in rotation the auger that comprises an output shaft being rotatable about an axis of revolution, wherein the axis of revolution of the output shaft is parallel and eccentric to the axis of rotation of the auger,
   a transmission unit configured to connect the output shaft and the auger, wherein the transmission unit comprises a pinion fitted onto the output shaft and a toothed crown rigidly fixed to the auger and meshing with the pinion,
   a connection flange configured to mutually fix the toothed crown and the auger,
   wherein at least one connection block is interposed between the connection flange and the auger, and
   wherein the connection block is fixed to the auger by means of a plurality of first axial screws.

2. The device according to claim 1, wherein the toothed crown is fixed coaxially to the outside of the auger.

3. The device according to claim 1, wherein the toothed crown is fixed proximal to a downstream end of the auger in an advancement direction imposed by the rotation of the auger on the solids transported.

4. The device according to claim 1, wherein the connection flange comprises a connection tube coaxially fitted onto the auger.

5. The device according to claim 4, wherein the connection tube is fixed to the auger by a first connection and is provided with at least one crest projecting in the radial direction to the outside of the connection tube, wherein the toothed crown is fixed to the crest by a second connection, wherein the second connection is a second threaded connection.

6. The device according to claim 5, wherein the first connection is a first welded connection.

7. The device according to claim 5, wherein the second threaded connection comprises a plurality of second axial screws.

8. The device according to claim 4, wherein the connection block is interposed between the connection tube and the auger.

9. The device according to claim 1, which comprises:
   a compartment in which the transmission unit is contained; and
   sealing gaskets interposed between a delimiting wall of the compartment and the connection flange.

10. The device according to claim 1, wherein the motor unit comprises a motor provided with a drive shaft and a gear motor provided with an input shaft, connected to the drive shaft of the motor, and of said output shaft.

11. The device according to claim 1, which comprises a final compacting screen located at a terminal stretch of the auger provided with an axial downstream end thereof, in the advancement direction of the solids imparted by the rotation of the auger by the motor unit.

12. The device according to claim 11, wherein the final compacting screen is rigidly fixed to the support frame.

13. A unit for transporting solids that comprises:
   a collection channel; and
   a device according to claim 1, wherein at least one end of the auger is inserted into the collection channel.

14. A device for transporting solids that comprises:
   a support frame,
   an auger connected to the support frame rotatably about an axis of rotation,
   a motor unit configured to activate in rotation the auger that comprises an output shaft being rotatable about an axis of revolution, wherein the axis of revolution of the output shaft is parallel and eccentric to the axis of rotation of the auger,
   a transmission unit configured to connect the output shaft and the auger, wherein the transmission unit comprises a pinion fitted onto the output shaft and a toothed crown rigidly fixed to the auger and meshing with the pinion,
   a connection flange configured to mutually fix the toothed crown and the auger,
   wherein the connection flange comprises a connection tube coaxially fitted onto the auger,
   wherein the connection tube is fixed to the auger by a first connection and is provided with at least one crest projecting in the radial direction to the outside of the connection tube, wherein the toothed crown is fixed to the crest by a second connection, wherein the second connection is a second threaded connection,
   wherein the first connection is a first threaded connection and comprises a plurality of first radial screws.

15. A device for transporting solids that comprises:
a support frame,
an auger connected to the support frame rotatably about an axis of rotation,
a motor unit configured to activate in rotation the auger that comprises an output shaft being rotatable about an axis of revolution, wherein the axis of revolution of the output shaft is parallel and eccentric to the axis of rotation of the auger,
a transmission unit configured to connect the output shaft and the auger, wherein the transmission unit comprises a pinion fitted onto the output shaft and a toothed crown rigidly fixed to the auger and meshing with the pinion,
a connection flange configured to mutually fix the toothed crown and the auger,
wherein the connection flange comprises a connection tube coaxially fitted onto the auger,
wherein the connection tube has an axial length less than or equal to a pitch of a spiral of the auger.

16. The device according to claim 15, wherein the connection tube has an axial length less than or equal to half the pitch of a spiral of the auger.

\* \* \* \* \*